Oct. 15, 1946.  M. F. KETAY ET AL  2,409,435
INDICATING MECHANISM
Filed Sept. 13, 1943  15 Sheets-Sheet 1

INVENTORS
Morris F. Ketay
Michael Sherman
BY
Martin J. Finnegan ATTORNEY

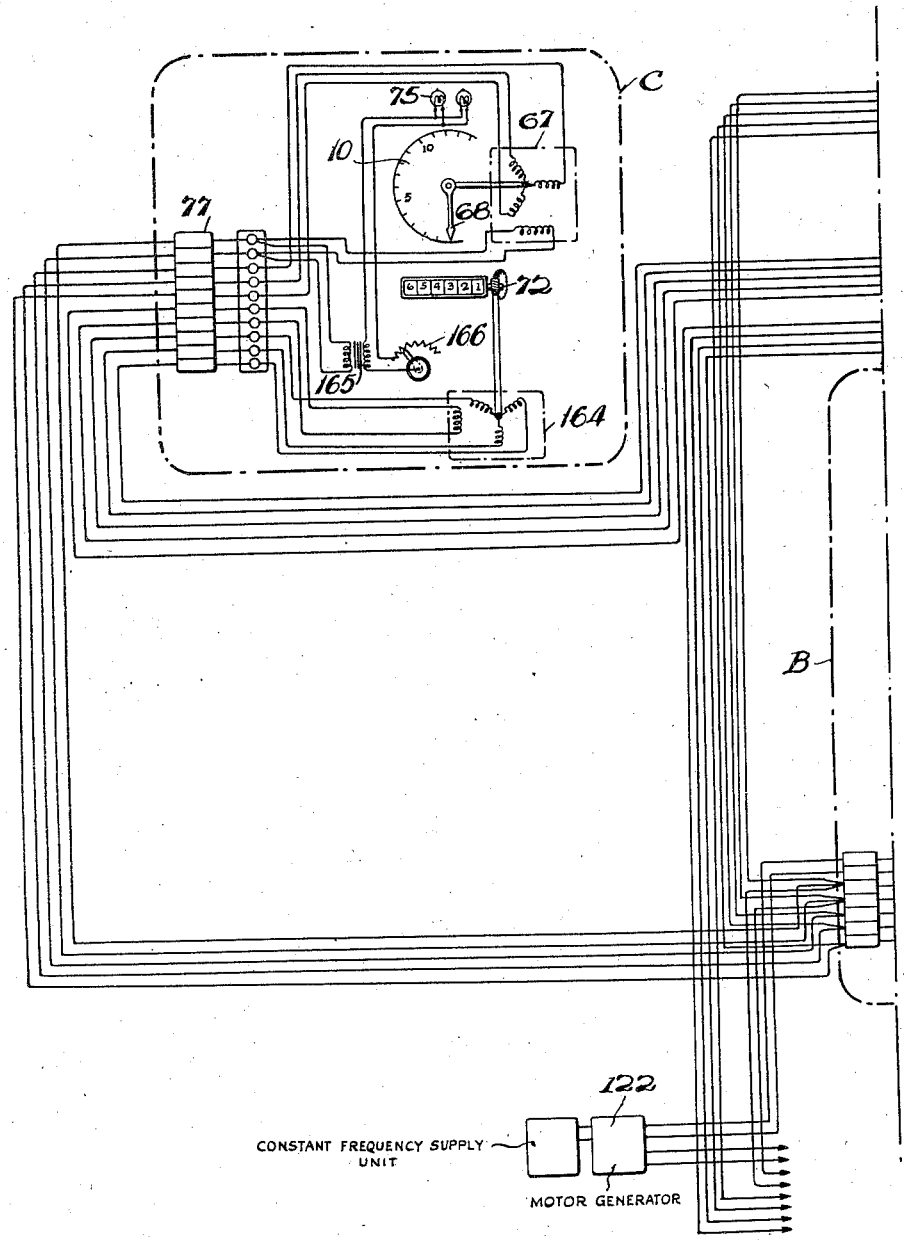

INVENTORS.
Morris F. Ketay
Michael Sherman.
BY Martin J. Finnegan
ATTORNEY

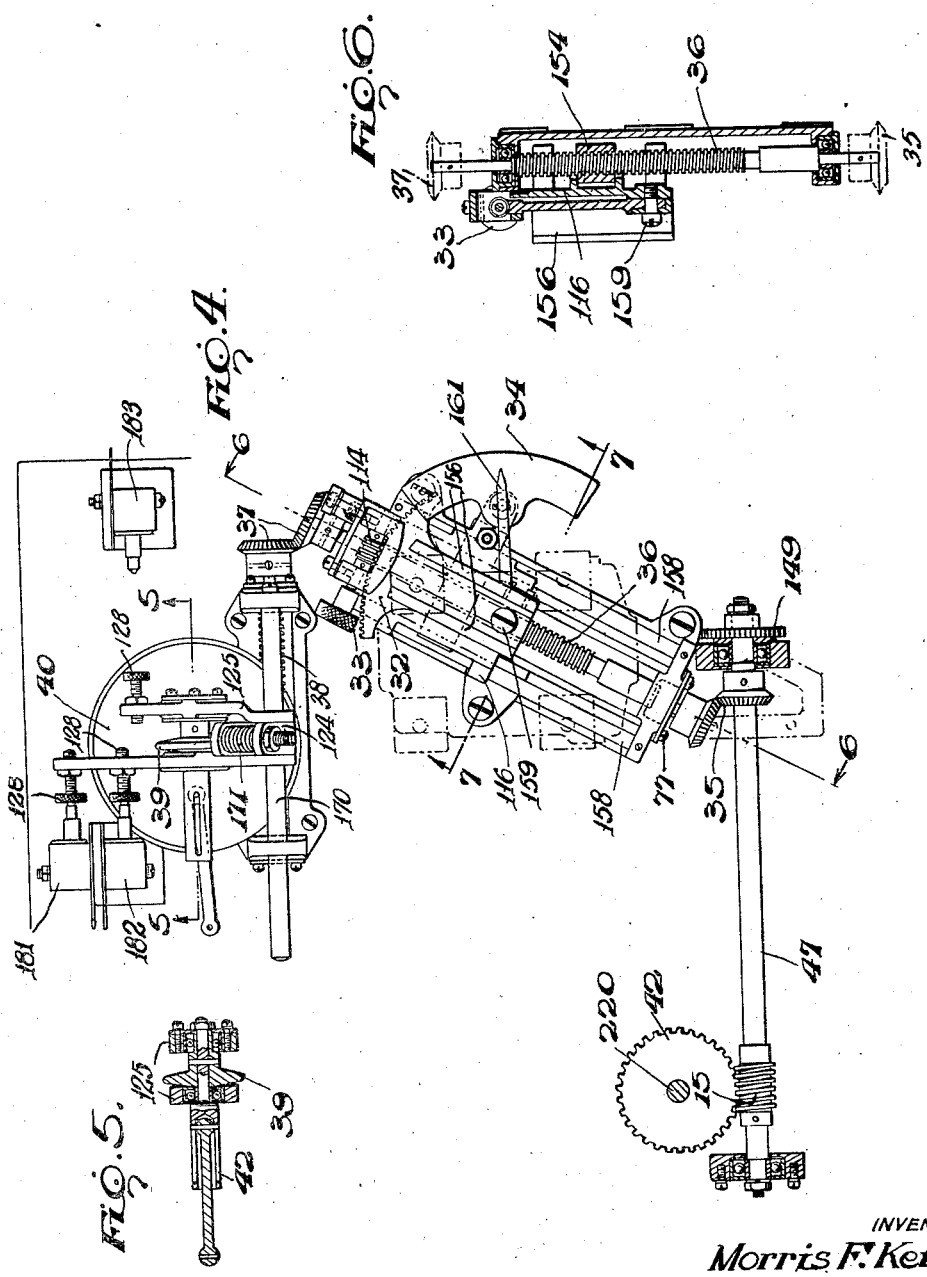

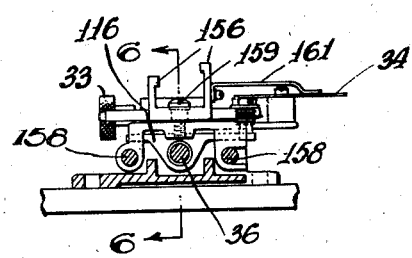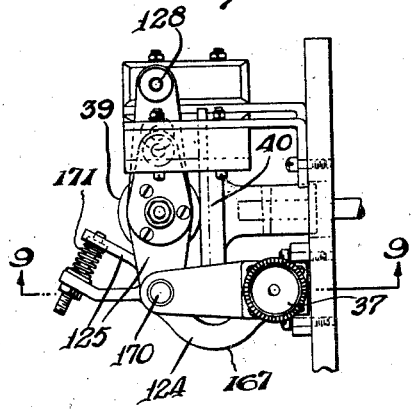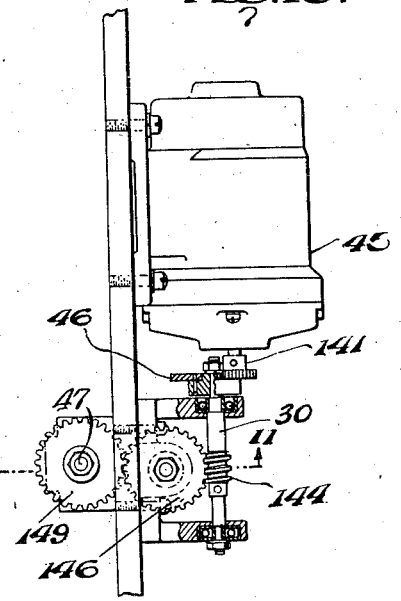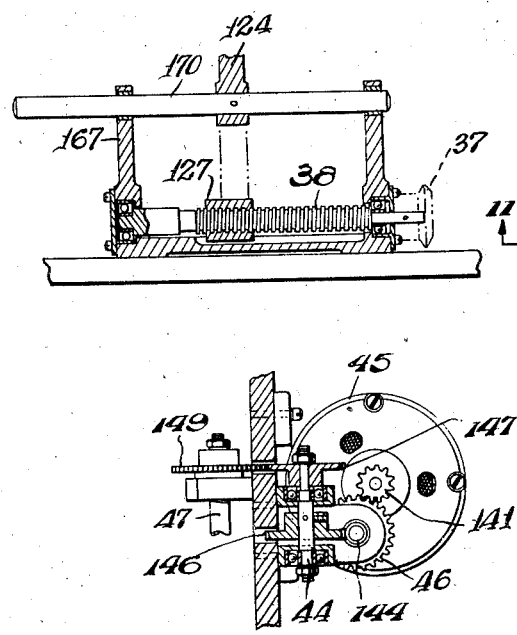

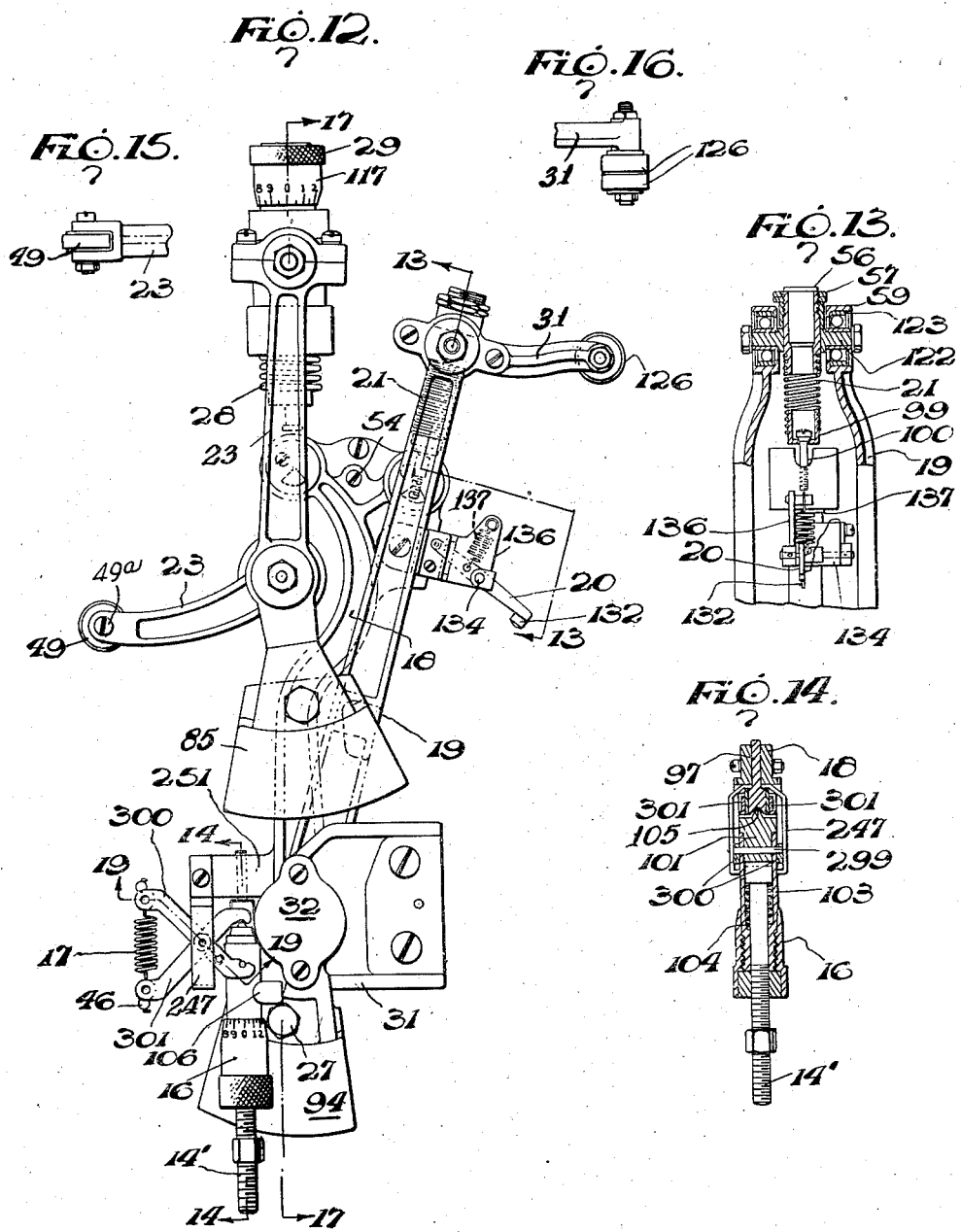

Oct. 15, 1946.    M. F. KETAY ET AL    2,409,435
INDICATING MECHANISM
Filed Sept. 13, 1943    15 Sheets-Sheet 7
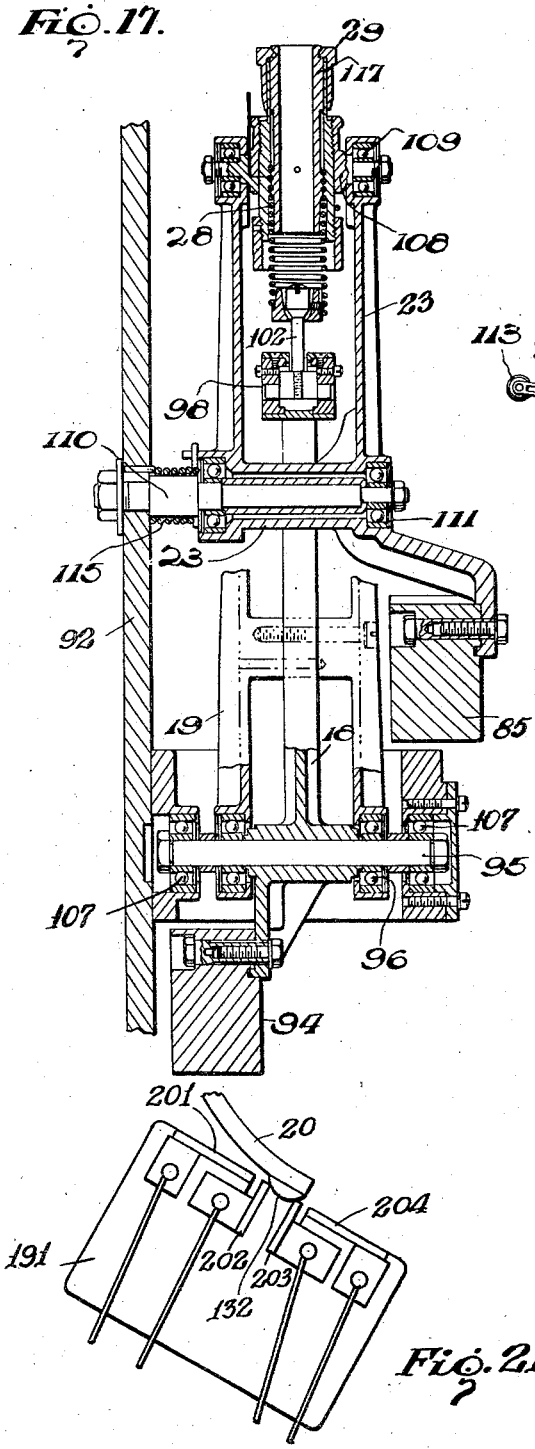
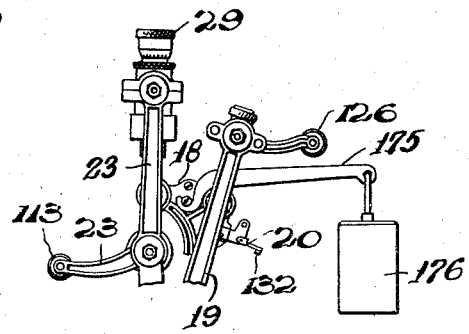
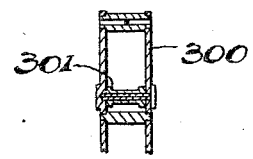
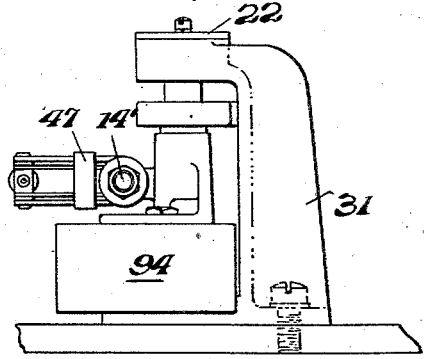
INVENTORS
Morris F. Ketay
Michael Sherman.
BY Martin J. Finnegan
ATTORNEY

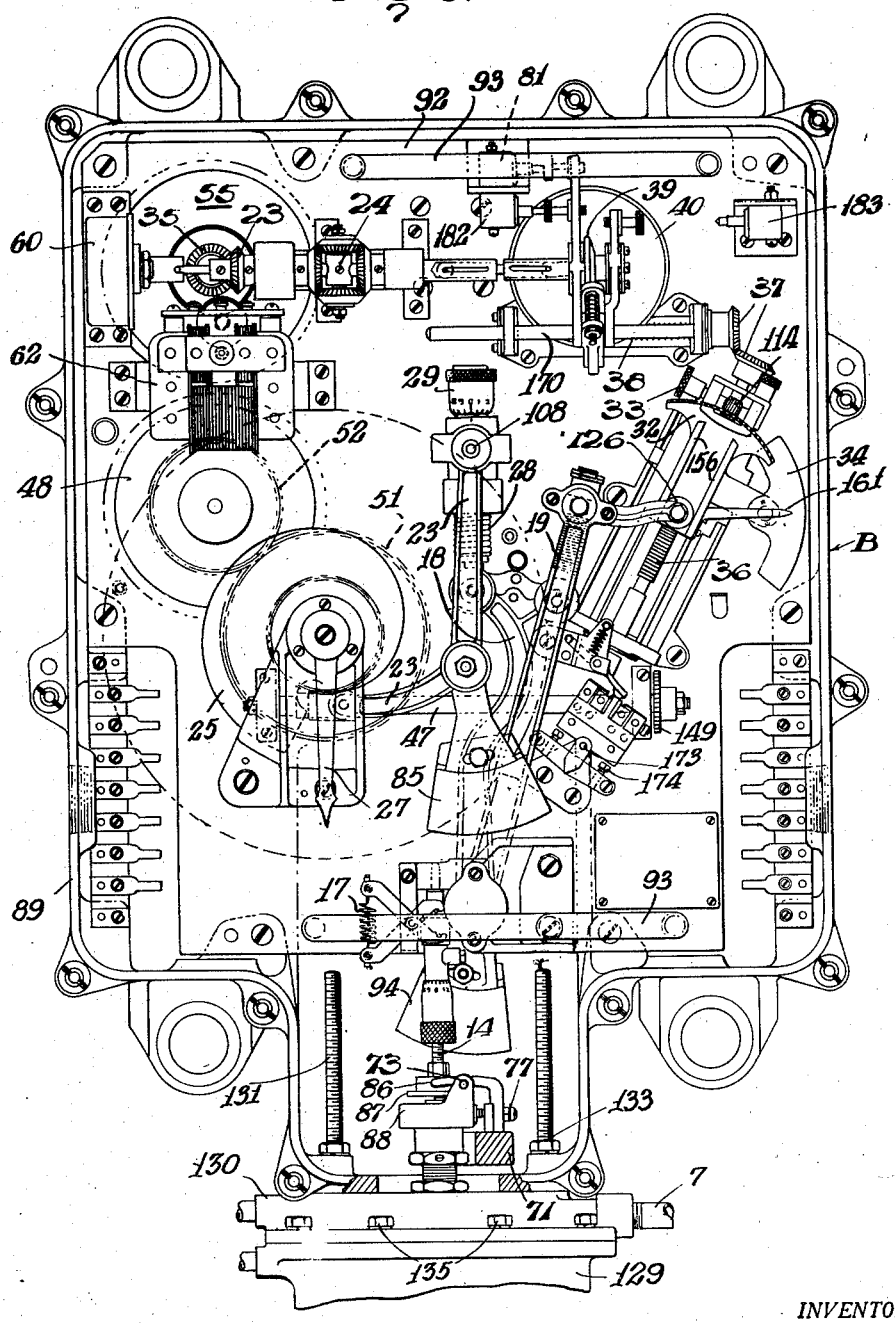

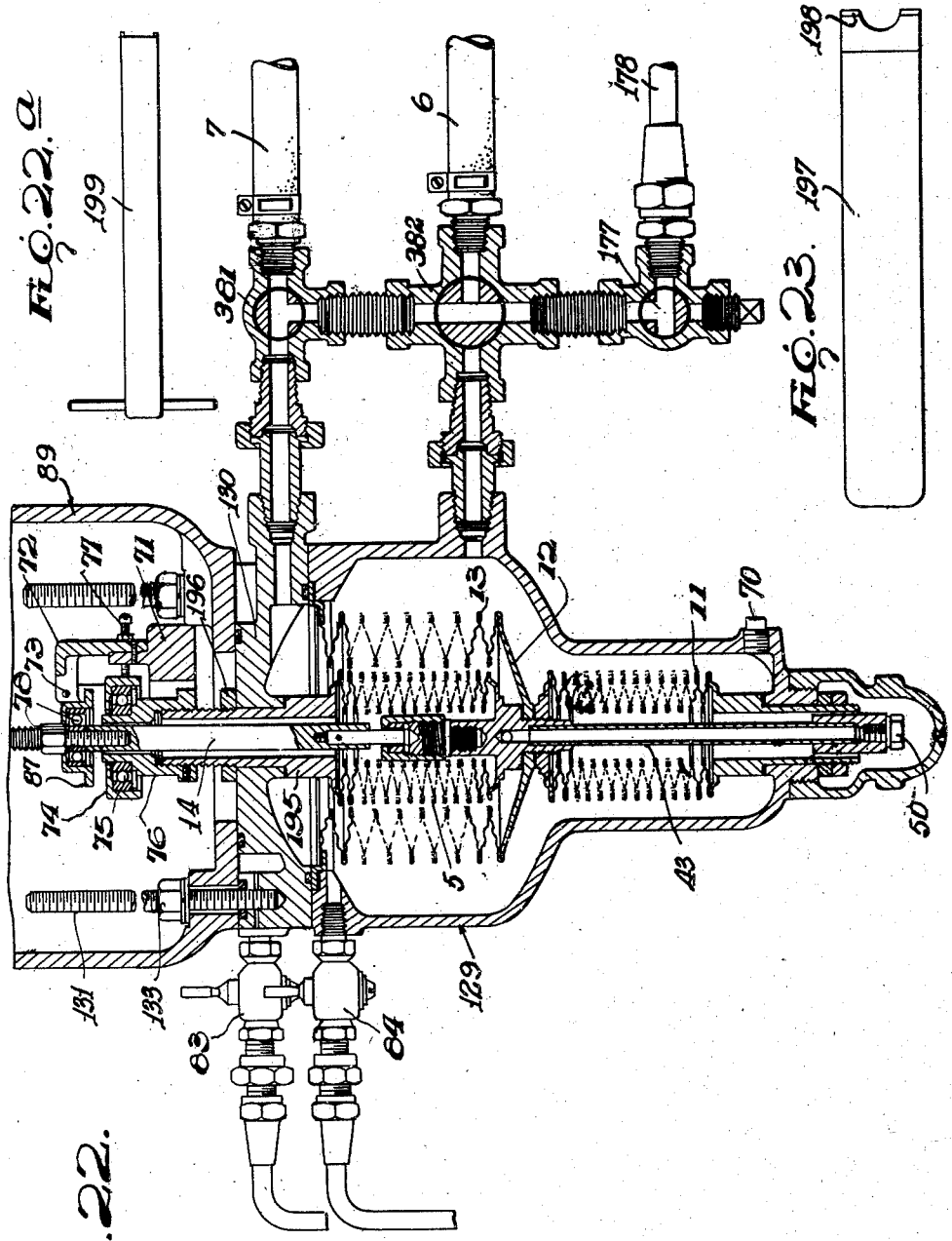

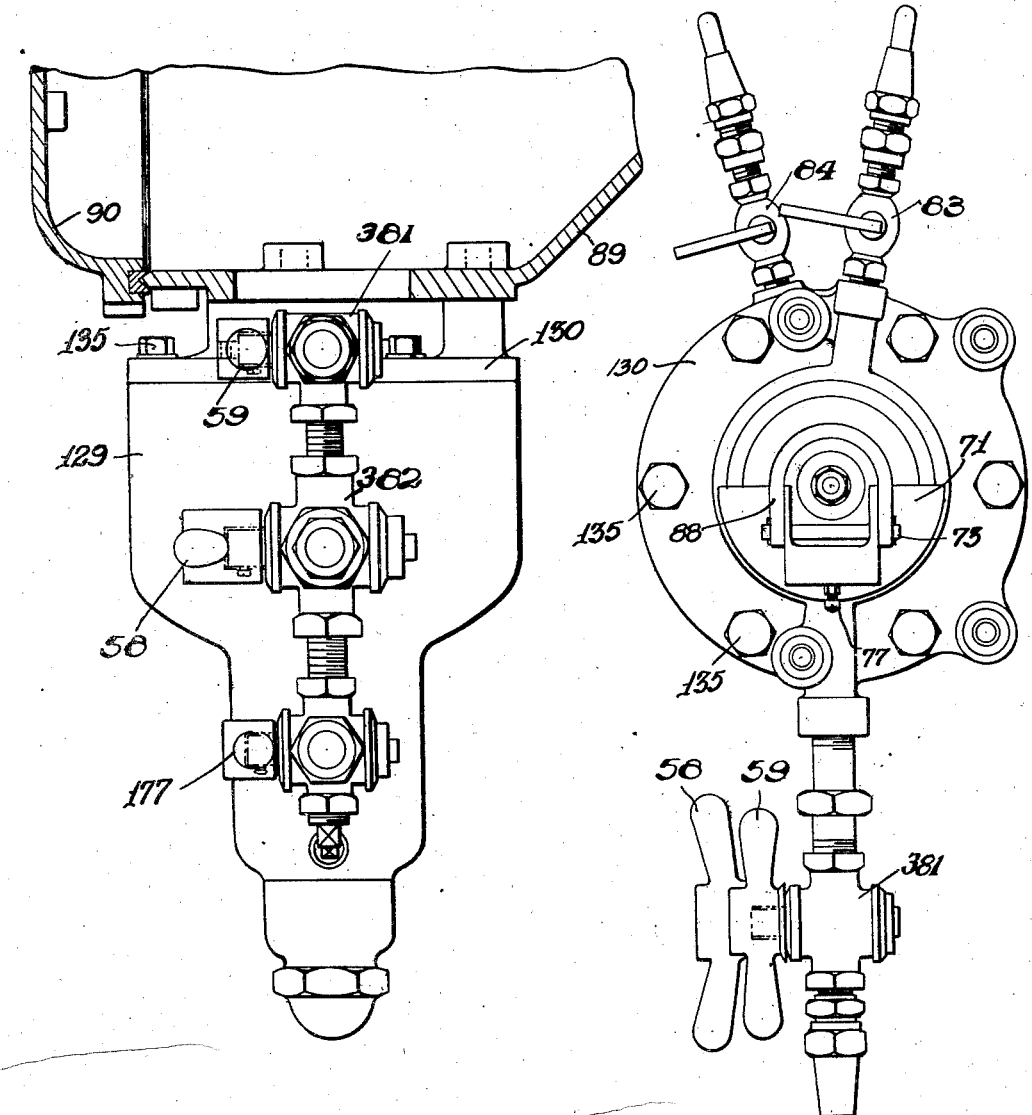

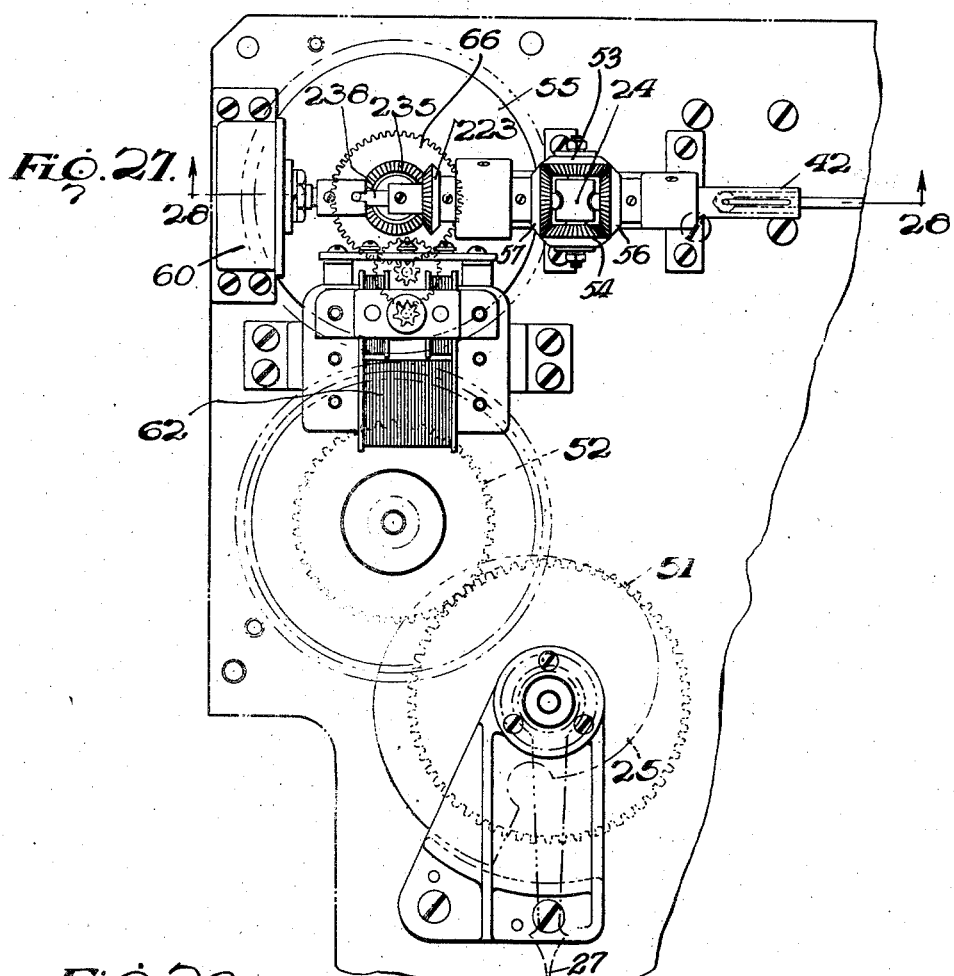
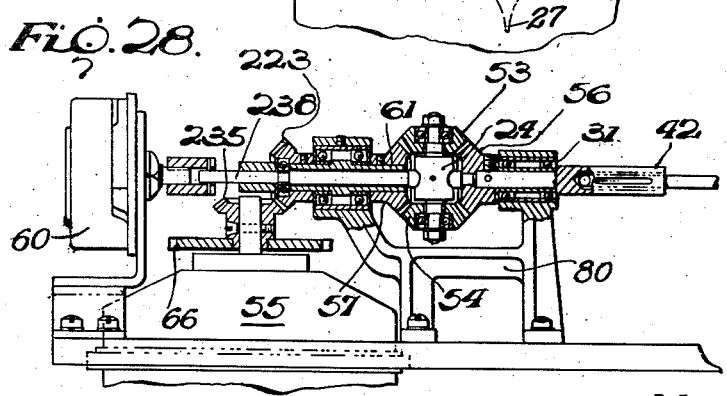

Oct. 15, 1946. M. F. KETAY ET AL 2,409,435
INDICATING MECHANISM
Filed Sept. 13, 1943 15 Sheets-Sheet 13
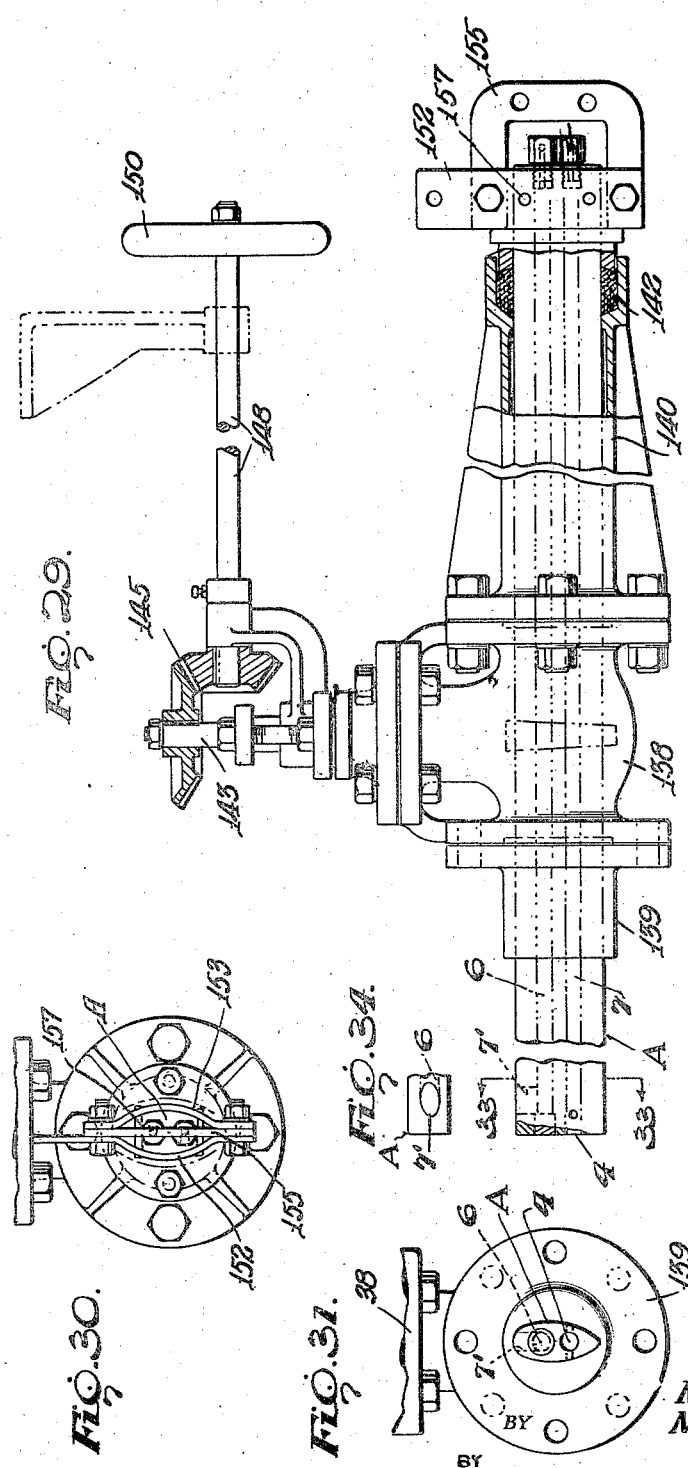
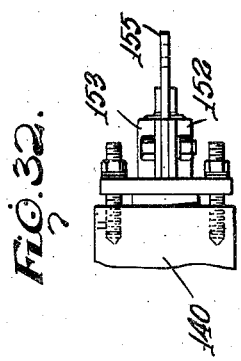
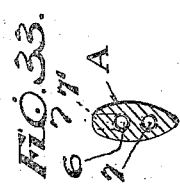
INVENTORS
Morris F. Ketay
Michael Sherman
BY Martin J. Finnegan
ATTORNEY

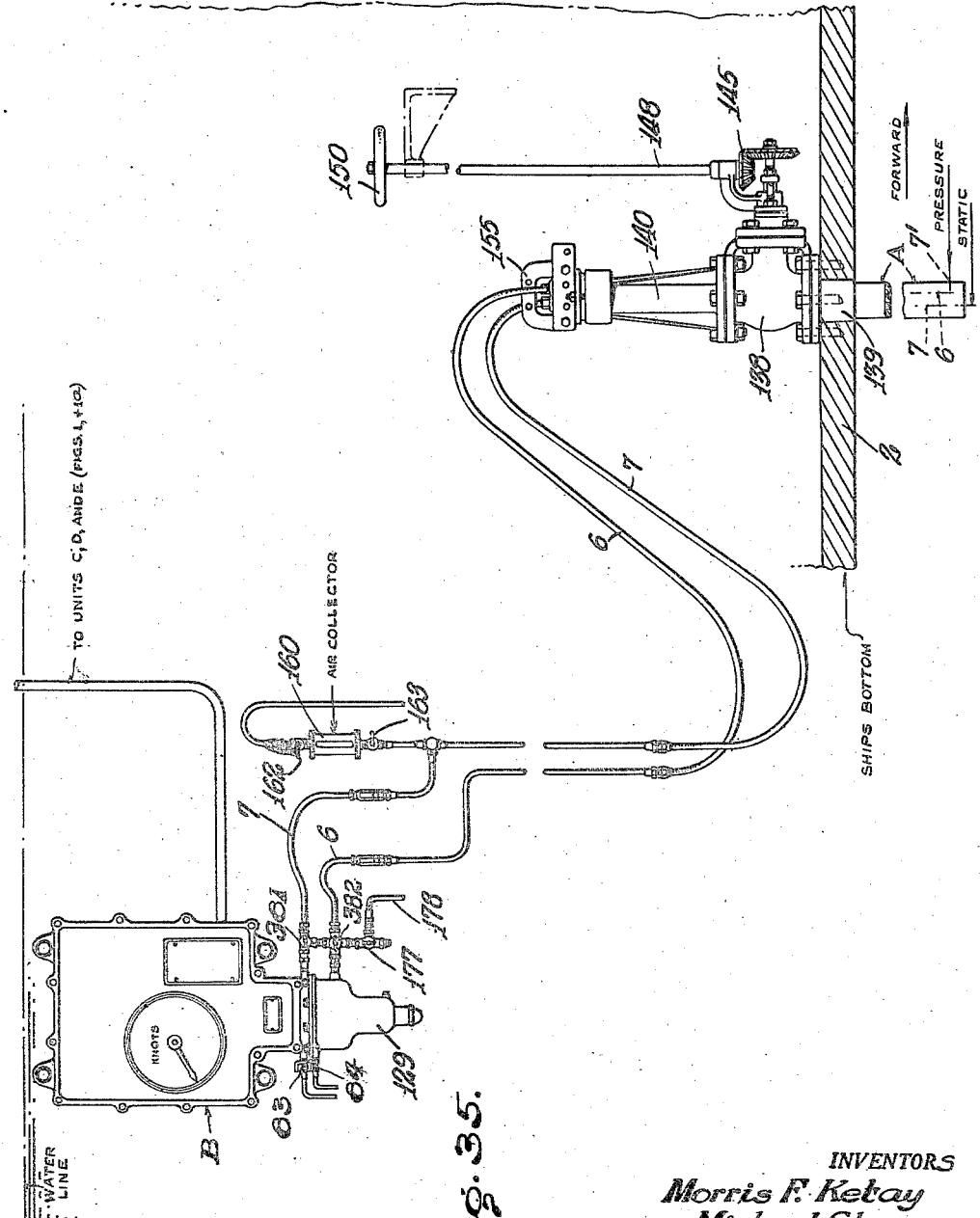

Fig. 36.

STREAM LINES ABOUT HULL OF SHIP.

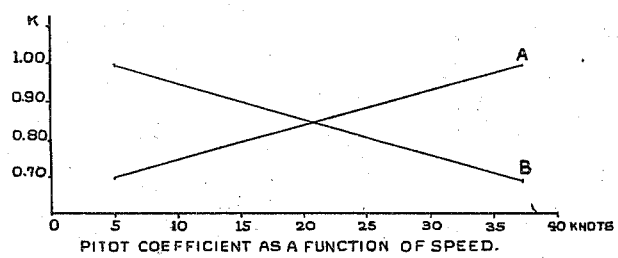

Fig. 37.

PITOT COEFFICIENT AS A FUNCTION OF SPEED.

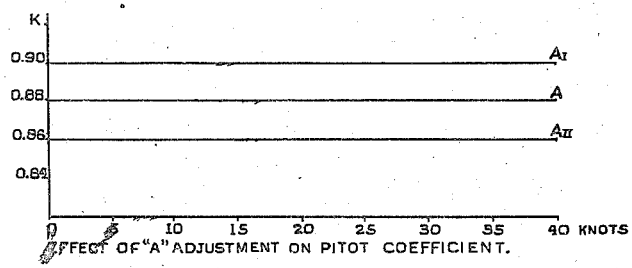

Fig. 38.

EFFECT OF "A" ADJUSTMENT ON PITOT COEFFICIENT.

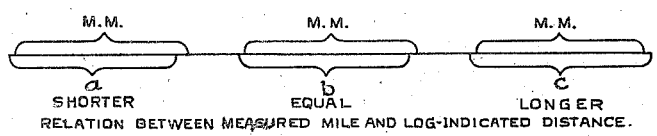

Fig. 39.

RELATION BETWEEN MEASURED MILE AND LOG-INDICATED DISTANCE.

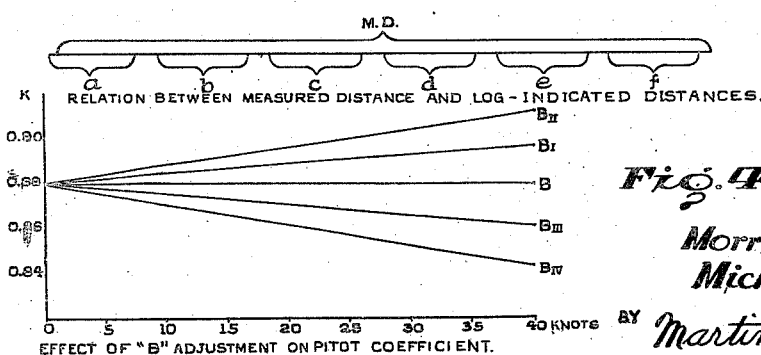

Fig. 40.

RELATION BETWEEN MEASURED DISTANCE AND LOG-INDICATED DISTANCES.

Fig. 41.

EFFECT OF "B" ADJUSTMENT ON PITOT COEFFICIENT.

INVENTORS
Morris F. Ketay
Michael Sherman
BY Martin J. Finnegan
Attorney

Patented Oct. 15, 1946

2,409,435

UNITED STATES PATENT OFFICE 2,409,435

INDICATING MECHANISM

Morris F. Ketay and Michael Sherman, Brooklyn, N. Y., assignors to Bendix Aviation Corporation, Teterboro, N. J., a corporation of Delaware Application September 13, 1943, Serial No. 502,210

9 Claims. (Cl. 73—388)

This invention relates to indicating systems, and particularly to provision of indications of the speed and distance of travel of a maritime vessel.

An object of the invention is to improve upon the "log" system disclosed in U. S. Patent No. 1,968,539 to Rydberg, dated July 31, 1934.

Another object of this invention is to provide means to maintain the accuracy of the mechanism in all tilted positions of the vessel, as from positions of extreme inclination to that of "even keel" (no roll or pitch).

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Figs. 1 and 1a together show the invention schematically;

Fig. 4 shows the drive mechanism for the speed and distance indicating devices;

Fig. 5 is a fragmental sectional view showing the roller assembly of Fig. 4;

Fig. 6 is a sectional view taken along line 6—6 of Fig. 7;

Fig. 7 is a sectional view taken along line 7—7 of Fig. 4;

Fig. 8 is an end view of the roller carriage of Fig. 4;

Fig. 9 is a longitudinal sectional view of the roller carriage taken on line 9—9 of Fig. 8;

Fig. 10 shows the drive motor and gear train for the assembly of Fig. 4;

Fig. 11 is a sectional view taken on line 11—11 of Fig. 10;

Fig. 12 is a front elevational view of the main force and balance arm assembly;

Figs. 13, 14 and 17 are sectional views taken along the respective section lines indicated in Fig. 12;

Figs. 15 and 16 are fragmental plan views of the roller carrying ends of the main force arm and the auxiliary balance arm shown in Fig. 12;

Fig. 18 shows a testing procedure for the arm assemblies of Fig. 12;

Fig. 19 is a sectional view on line 19—19 of Fig. 12, illustrating the manner in which the scissors links are pivotally interconected;

Fig. 20 is a bottom plan view of the assembly of Fig. 12;

Fig. 21 shows, on an enlarged scale, the upper part of unit "B" as viewed from the front;

Fig. 21A is a fragmental view on an enlarged scale of the switch for controlling the power motor shown in Figs. 1 and 21;

Fig. 22 shows, also on an enlarged scale, the lower part (bellows assembly) of unit "B";

Fig. 22a shows a special wrench to facilitate installation and removal of the bellows rod 14;

Fig. 23 shows a special wrench to facilitate installation and removal of the bellows cap 195;

Fig. 24 is a side elevational view of the assembly of Fig. 22 as it appears when viewed from the right-hand side of that figure;

Fig. 25 is a top plan view of the assembly of Fig. 22;

Fig. 27 is a front elevational view of the subassembly of Fig. 26;

Fig. 28 is a longitudinal sectional view along line 28—28 of Fig. 27;

Fig. 29 shows the rodmeter assembly, including control valve;

Fig. 30 is an end view of the assembly of Fig. 29 illustrating the parts as they appear when viewed from the right-hand side of that figure.

Fig. 31 is a view showing the opposite end;

Fig. 32 is a view showing the handle fixture secured to the sea rod of Fig. 29, the view being taken at right angles to that view;

Fig. 33 is a sectional view taken along line 33—33 of Fig. 29;

Fig. 34 is a fragmental top plan view of the end of the sea rod of Fig. 29, showing the forwardly disposed Pitot orifice in the sea rod;

Fig. 35 is a diagrammatic showing of hydraulic connections between the rodmeter and log units;

Fig. 36 is a diagrammatic view showing the stream lines about the hull of the ship;

Fig. 37 is a diagrammatic showing of the relationships between the Pitot coefficient and the speed for two different log installations;

Fig. 38 is a diagram showing the effect of the "A" adjustment upon the Pitot coefficient;

Figs. 39 and 40 are diagrams showing various relationships between the measured distance and the log indicated distance; and Fig. 41 is a diagram showing the effect of the "B" adjustment upon the Pitot coefficient.

Figure 1:
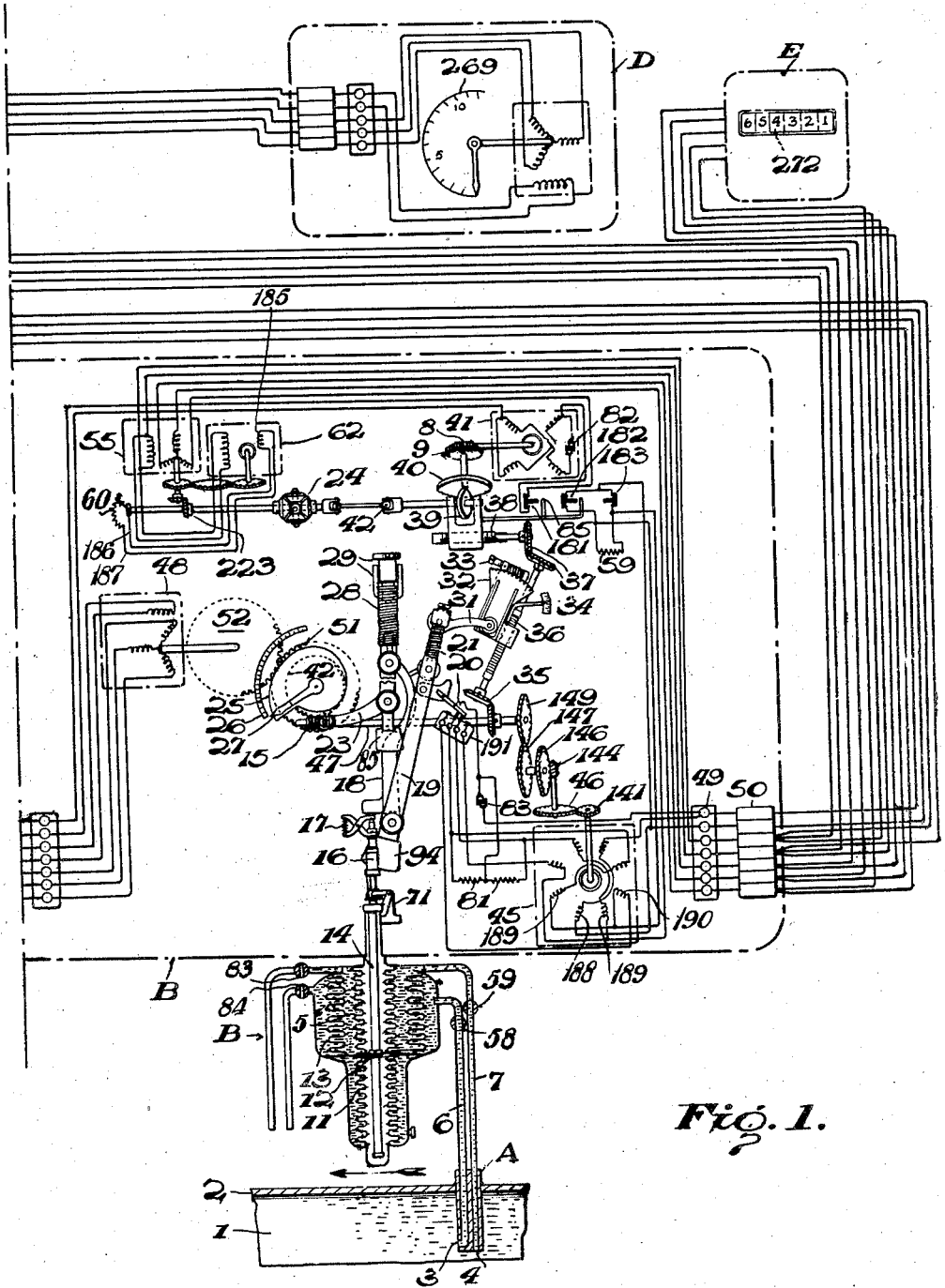
Figure 2:
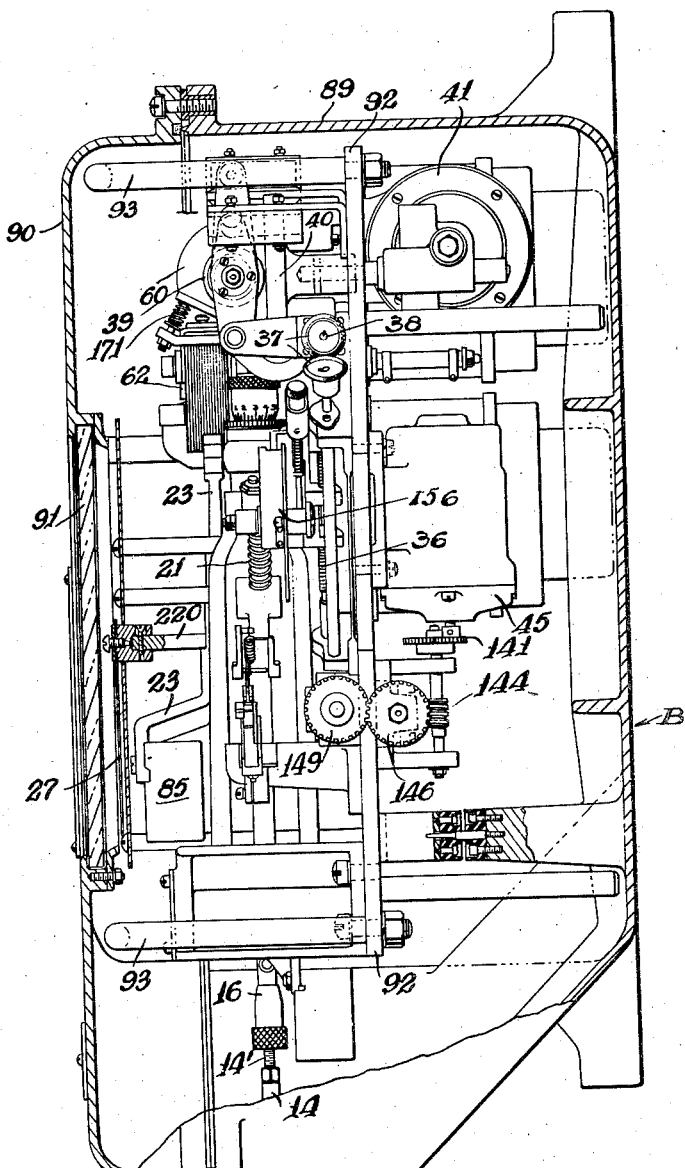
Fig. 2 shows the unit master transmitter "B" of Fig. 1, as viewed from one side with housing broken away.

In Figs. 1 and 1a the complete system is shown schematically as including a rodmeter A, a master transmitter-indicator B, and receiver indicators C, D and E. The master transmitter-indicator B is mounted above the ship's bottom 2, but below the ship's waterline (see Fig. 35), and consists of a series of electro-mechanical linkages and a bellows assembly 5, 11, 13 which is divided into two chambers by means of diaphragm 12. A rod 14 moves with the diaphragm 12, to which it is attached.

The upper part of the bellows chamber is connected with the sea (indicated at 1, Fig. 1) through the static line 7 containing control valve 381, and through static openings 4, one on each side and one flush with the bottom of rodmeter A, the latter extending through the ship's bottom, indicated at 2 in Figs. 1 and 35.

The outer part of the bellows chamber is connected with the sea through the Pitot or dynamic line 6 containing control valve 382, and the Pitot orifice 3 of rodmeter A. Due to equalization of static pressures acting thereon, through lines 6 and 7, diaphragm 12 will remain stationary when the ship is at rest.

With the ship in forward motion (or for an increase in speed), an extra pressure ("speed pressure") is created in the Pitot orifice 3, causing diaphragm 12 to rise due to unequal Pitot-static pressures. This movement is transmitted to the scissors mechanism by means of rod 14, and the scissors mechanism (see Figs. 12 and 14) causes the main balance arm 18 to pivot clockwise about its pivot shaft 95 (see Fig. 17), thereby causing electrical contact 20 to close a circuit to energize actuator motor 45, the motor energizing circuit being in several branches, including the wires shown in Figures 1 and 21A as proceeding from contact segments 201—204 engageable by the contact element 20. Energization of these wires leading to the several windings of motor 45 produces rotation of said motor, which rotates cam 25 clockwise (through mechanical connections 46, 47, 15, 42 and 220—Figs. 4 and 10). As this movement proceeds, it causes main force arm 23 to pivot in a counter-clockwise direction to stretch main spring 28, causing main balance arm 18 and contact 20 to return toward their neutral position, thus eventually cutting off current flow to motor 45, when the neutral position is attained. Rod 14 and the attached bellows are accordingly depressed by the cam action into their original positions and a certain amount of water is forced back into line 6. Main force arm 23 however, remains in its new (spring tensioning) position, and pointer 27, attached to the shaft 220 of cam 25, whose angular position reflects the angular position of arm 23, except for the fact that the cam is given a contour to convert the non-rectilinear relationship between bellows pressure and speed into a straight line relationship on the indicator dial whereby the latter may be provided with scale divisions of equal value, will then indicate the ship's speed on scale 26.

Upon a decrease in speed, the rod 14 moves downward, allowing main balance arm 18 to pivot in a counterclockwise direction. Contact 20 then closes another circuit and starts the actuator motor 45 in the opposite direction, turning cam 25 counterclockwise, which causes main force arm 23 to pivot clockwise, reducing the force transmitted through spring 28, until main balance arm 18 returns to its neutral position, whereupon contact 20 again cuts off current flow to power motor 45. Pointer 27 then indicates the new (reduced) speed.

The functioning of the apparatus is, as previously mentioned, based upon the measurement of the pressure in a Pitot tube created by the prevailing speed. The relation between the pressure and the speed is expressed by the following formula:

$$P = Kv^2$$

where P is the pressure, K a coefficient (hereinafter called the "Pitot coefficient") and $v$ the speed of the ship.

If the Pitot opening should move in absolutely undisturbed water, the Pitot coefficient K would have a value equal to 1. Actually, the water surrounding the hull of a moving ship is disturbed. The stream lines will diverge and converge, as shown on Fig. 36, the angles varying with the speed of the ship. Also, the depth of the layer of water that is dragged along with the ship varies at different places of the hull and varies with the speed of the ship. The degree of disturbance varies in an inverse ratio with the distance from the hull, until it is at a certain distance nil. This latter distance, in turn, varies with the speed of the ship. Therefore, the degree of disturbance at the point of the Pitot opening will vary with the different speeds of the ship (unless the Pitot tube were to be made long enough to extend beyond the region of disturbance, but this is for practical reasons very seldom possible).

The Pitot coefficient K in the above mentioned formula therefore represents the reducing or correcting influence to compensate for the effect of this variable disturbance factor on the speed pressure.

Experience has proven that the value of this coefficient K (plotted against speed) may be represented as a straight line, for example, A or B (see Fig. 37). Of these, the line A represents the more common condition encountered in practice.

To make it easier to understand the calculations for the proper adjustment of the "log," the error of the log will, in the following, be expressed as so many per cent (+ or —) of the true speed, instead of in the form of Pitot coefficient. Comparing the two ways of expressing the error of the log, it will be found that if the Pitot coefficient to which the log is adjusted is too low compared with the actual Pitot coefficient of the ship, the log will indicate too high a speed and a greater distance than that actually travelled, giving a positive percentage error. If, on the other hand, the log is adjusted for a Pitot coefficient that is too high, then the percent of error will be negative.

Without adjusting means, the error of the apparatus would, with a variable Pitot coefficient, also be variable. This variation may gradually increase from say 2% at low speeds to 6% at high speeds, or decrease from say 6% at low speeds to 2% at high speeds.

The disclosed apparatus has three adjustments, designated herein as "A," "B" and "C."

The "C" adjustment (internally threaded sleeve 16, Figs. 1, 12 and 14) relates only to the adjustment of the zero position of the mechanism, i. e. to bring pointer 27 to zero when the ship is at rest.

The adjustment "A" is for the adjustment of the main spring 28 (Fig. 1) through increasing or decreasing the number of effective windings of the same. The adjustment "B" is for the adjustment of the regulating effect of the auxiliary spring 21 (Fig. 1) on the moment exerted by auxiliary arm 19 upon the main lever 18.

By means of adjustments "A" and "B" the apparatus is set for the actual Pitot coefficient of the ship, as determined by running the ship over a measured course.

Figures 38 and 41 illustrate the influence of the adjustments "A" and "B" upon the mechanism, from which it is observed that the effect of the "A" adjustment is constant at all speeds, whereas the "B" adjustment may be so carried out as to manifest either an increasing or decreasing action as the speed increases.

Fig. 37 is a graph showing the relationship between the Pitot coefficient and speed for two different installations from which it is observed that a straight line ratio exists in both instances. In most instances however, the relationship will assume the form of line A, with the coefficient increasing with the speed.

In Fig. 39 the relationships between the measured mile and the mile as indicated by the log are illustrated, the left-hand diagram showing a negative error, with the indicated mile shorter than the actual distance, the middle diagram showing the correct setting with the indicated and measured distances equal, and the right-hand diagram showing a positive error. Fig. 40 diagrammatically shows the results of several readings taken over a comparatively long measured run.

At first, the "B" adjustment is supposed to be set in its zero position. When the speed-indicating hand leaves zero, the sector 32 (Fig. 1) moves downward and continues to descend until the prevailing speed is reached. With the "B" adjustment in the zero position, this movement will not have any influence on the roller attached to the arm 31 of the auxiliary lever 19 (Fig. 1), the roller remaining in the same position during the whole time, as will be hereinafter pointed out. Therefore, the system will not be influenced by the auxiliary tension spring 21, but only by the main tension spring 28, and equilibrium will be obtained when the latter spring is moved into a position for which its moment, (tension "$a$" times leverage "$b$") is equal to the moment of the force of the bellows ("$c$" times "$d$") on the same lever.

The tension of the main spring, however, can be adjusted by screwing plug 29 (Fig. 1) into or out of the spring, thereby varying the number of effective turns. This is adjustment "A." By decreasing or increasing the number of effective turns, the spring will be made stiffer or weaker. Thus if the system (when tested by running the vessel over a measured course) should indicate too high, the main spring 28 must be stiffened ("A" adjustment increased in numerical value) so that the moment is increased to obtain correct indications. The effect of such an adjustment is graphically illustrated in Fig. 38. The line A represents a certain Pitot coefficient and the lines $A_I$ and $A_{II}$ represent, respectively, the new values of Pitot coefficient when the number of effective turns of the main spring is decreased or increased, it being observed that the effects of the several adjustments remain constant for all speeds.

Now, if the adjustment B (screw 33, Fig. 1) is set to the right of its zero position, the sector 32, when moving downward will force the auxiliary lever 31 (through its roller) to the right. The auxiliary spring 21 will then be pulled to the right and at the same time stretched, whereby it will exert a moment on the main lever acting oppositely to the moment of the main spring 28 and thereby reducing the effect of the same on the main lever.

Likewise, if the adjustment "B" is set to the left, the runner 32 will force the auxiliary lever 31 to the left, whereby the moment of the auxiliary spring on the main lever will add to the moment of the main spring on that lever.

When the speed indicating hand 27 points to zero, the setting of the "B" adjustment on either side of its zero position does not have any effect on the roller, between the guides of the runner, because the axis of the roller then coincides with the axis of sector 32, but as soon as the hand leaves its zero position, the increasing or decreasing effect of the auxiliary spring will increase with the speed, and the further to the left or to the right the "B" adjustment is set, the greater will this effect be. Fig. 41 shows graphically the influence of the "B" adjustment on the Pitot coefficient. The line B represents the Pitot coefficient with the "B" adjustment set at zero. $B_I$ shows the effect of the "B" adjustment set to the left. $B_{II}$ shows the effect of the "B" adjustment set still further to the left. $B_{III}$ shows the effect of the "B" adjustment set to the right, and $B_{IV}$ shows the effect of the "B" adjustment set still further to the right. It is thus obvious that if the Pitot coefficient is increasing with the speed, the "B" adjustment must be set to the left in order to increase the moment on the main lever to balance the increased moment of the force from the bellows on that lever, and bring about correct indications.

If, on the other hand, the Pitot coefficient is decreasing with increasing speed, the "B" adjustment must be set to the right in order to decrease the moment of the springs on the main lever and balance the decreased moment of the force from the bellows.

From what is stated above, it will be understood that by means of the "A" adjustment, a correction can be performed which affects all indications alike with a constant percentage as the speed increases, and by the "B" adjustment there is effected a correction which affects the indications with an increasing or decreasing percentage as the vessel's speed increases.

Motor 45, which drives the cam 25 through shaft 47, also drives gears 35, screw 36, gears 37 and screw 38, positioning carriage 167 and friction wheel 39 along the surface of disc 40, the latter being driven at constant speed by a synchronous motor 41 a worm 8 and a worm gear 9. The driving ratio of friction wheels 40 and 39 thus varies directly as the distance from the point of frictional contact to the center of disc 40; and since the follower 39 is driven by the same motor 45 that positions the speed pointer 27, it follows that the distance from the frictional contact point to the disc center varies directly as the ship's speed. When follower 39 is therefore set so that when the log indicates zero speed, it is at the center of disc 40. Therefore, the mileage odometer 72 (shown in Fig. 1a as electrically and mechanically coupled to the follower 39 through differential 24 and synchronous units 55 and 70) will indicate the distance travelled (nautical miles).

Figure 26:
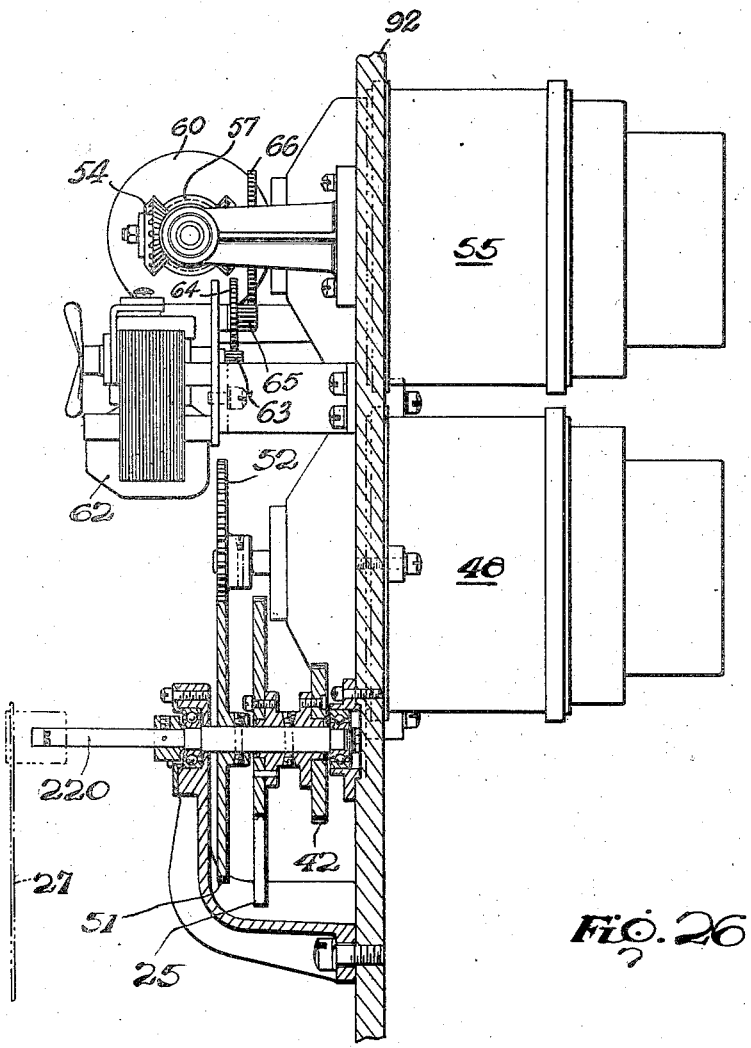
Fig. 26 is a fragmental side view with parts in section, of the left-hand portion of the "log" mechanism.

The unit "C" (Fig. 1a) includes not only the odometer 72 but also a speed dial 10 and pointer 68, operated by a self-synchronous motor 67 connected to a synchronous unit 48, the latter being shown in Fig. 1 as driven by gears 51 and 52, which are in turn driven by power motor 45 through connections 46, 47, 15, 42 and 220 which drive speed pointer 27 (see Figs. 4 and 26). The arrowheads in the lower portion of Figure 1a denote connections to sources of alternating current.

The units "D" and "E" (Fig. 1) are electrically synchronized with synchronous generators 48 and 55, respectively.

Rotation proportional to the speed of the ship is transmitted to pointer shaft 220 (Fig. 26) by gear 42, which is fastened to that shaft and driven by a worm 15 on shaft 47 (Figs. 1 and 4). The latter is driven by power motor 45, through a pinion 141 on the motor shaft meshing with a gear 46 on a worm-shaft 30; a worm 144 meshing with a worm gear 146 carried by a shaft 44; and a gear 147 on shaft 44 which meshes with gear 149 on shaft 47. The cam 25, fastened to the pointer shaft 220 is so designed that in turning an amount proportional to the ship's speed, it restores to neutral the main force and balance arm assembly 23—18—19, thus moving contact arm 20 to neutral position and shutting off the power motor 45. This speed indicating rotation is transmitted by gear 51 (on the pointer shaft 220) to gear 52, in such a ratio that 240° rotation of the pointer shaft 220 results in 360° rotation of the gear 52, and hence of the synchronous generator 48, which is driven by said gear (Fig. 26).

The novel means for amplifying the torque available for operating the distance transmitter 55 is best shown in Figs. 26, 27 and 28, and includes a differential 24 and a follow-up motor 62, each geared to transmitter 55. Motor 62 is connected to motor 55 by means of a pinion 63, a gear 64, a pinion 65, and gear 66 fixed to the shaft of motor 55. A bevel gear 235 on the shaft of transmitter 55 meshes with a gear 223 carried by a sleeve 61 journalled in one arm of a pedestal 80. Rotation proportional to distance travelled is transmitted from disc 39 to the differential 24 through the universal joint 42. With the transverse spindle of differential 24 stationary, the two differential gears 53, 54 transmit (with a reversal of direction) the rotation of input gear 56 to output gear 57. Through bevel gears 223 and 235 (Fig. 28), and a hollow shaft 61, output gear 57 drives the distance transmitter (synchronous generator) 55.

A rheostat 60 controls the torque output of motor 62, and is operated by a shaft 238 extending from the spider of differential 24, which carries the gears 53 and 54. When the reaction of the load on the distance transmitter 55 exceeds the friction of rheostat 60, the output gear 57 of the differential revolves more slowly than the input gear 56, and the spider of the differential rotates, turning shaft 238 and rheostat 60 in such a direction as to decrease the resistance, causing the follow-up motor 62 to supply additional torque to the unit 55. Similarly, when the output gear 57 revolves faster than the input gear 56, the differential shaft 238 turns rheostat 60 in such direction as to increase its resistance, causing a decrease in the torque supplied to the unit 55 by follow-up motor 62. Thus, the differential 24, in combination with motor 62, functions as a power amplifier and keeps the input and output gears revolving at synchronous speeds without overloading the integrating mechanism.

Should the arm of rheostat 60 reach the limit of its motion before synchronism is attained, additional load is applied to the integrating mechanism, but before slipping can occur between the disc 40 and follower 39, the rheostat arm slips on its driving shaft. Any suitable type of friction coupling (not shown) may be employed to secure the rheostat arm to its shaft. Rheostat 60 is of such electrical value that when it has reached the maximum resistance position just referred to, induction motor 62 still supplies a small torque to the transmitter 55. It will reach that position, however, only at low speeds and small loads, and under these conditions the speed of the output shaft 61 is held to the speed of the input shaft 42 by the friction between driving disc 40 and follower 39. At high speeds and large loads, however, the torque output of the induction motor 62 is adjusted to the load through the above-described novel control of rheostat 60.

As heretofore noted, the main force and balance arm assembly (Figs. 12 to 21) consists of three levers: the main balance arm 18, the main force arm 23, and the auxiliary balance arm 19, which together form the equilibrating arrangement. The main balance arm has a counterweight 94, which brings its center of gravity into the center line of balance shaft 95 (Fig. 17) about which it pivots on ball bearings 96. Counterweight 94 is not intended to be moved from its position, as this would cause errors in readings, uncorrectable by the adjustments provided. Similarly, main force arm 23 carries a counterweight 85 for balancing it.

The moments acting on the main balance arm 18, which maintain it in equilibrium, are produced by:

1. The force produced by the bellows and transmitted through the rod 14 to the main balance arm 18 (see Fig. 12);
2. The force produced by the main spring 28 acting through an anchor screw 102 on the rocker bearing 98, attached to the upper end of the main balance arm 18 (see Fig. 17); and
3. The force produced by the auxiliary spring 21 acting on spring holder 99 and anchor screw 100 attached to the upper right portion of the main balance arm (Figs. 12 and 13).

The top of the rod 14, as shown in Fig. 14, has a cap 101 receiving a pin 299 to which are pivotally attached the arms 300 of the scissors arrangement, which scissors arrangement also includes arms 301 disposed on either side of the pivot member 97 (Fig. 14), which in turn is slidably received in the bracket 251 extending laterally from the main arm 18. The corresponding arms 300 and 301 of the scissors are pivotally connected to each other within the depending leg 247 of the bracket 251. A tension spring 17 acts upon the ends of the scissors elements, and the joint thus formed is adapted to exert a constant pressure urging fulcrum 105 of cap 101 into into engagement with its seat in bearing member 97. The latter and fulcrum 105 convert vertical movement of the rod 14 (in either direction) into a swinging movement of the main balance arm 18 about its pivot shaft 95 (see Fig. 17). For each turn of the micrometer thimble 16, the micrometer barrel 103 moves upward against micrometer spring 104 a distance of 0.1 inch, which is transmitted to the main lever at the pivot 97, thereby providing a zero adjustment, called the "C" adjustment. The number of turns, as well as fractions of turns, can be observed on the scale provided, and the whole arrangement locked by means of a stop screw threaded into a boss 106 (Fig. 12). The stop screw is threaded into sleeve 103 and bears against the shank of screw 14' so as to lock the two parts against relative rotation. The "C" adjustment changes the effective length of the rod 14 connecting the bellows to the main balance arm 18.

The main spring 28 is attached to the main force arm 23 through axle 108 on ball bearings 109. The force produced by the main spring 28 upon the main balance arm 18 depends upon the position of the main force arm 23 which pivots on ball bearings 111 carried by balance shaft 110, under the action of the main cam upon ball bearing roller 49 (Fig. 12), which is kept in contact with the cam by a force load spring 26.

The adjustment of the main spring 28 is effected by turning the spring thimble 29 fastened to the spring adjustment screw 117, whereby the number of effective windings of the spring is increased or decreased. The number of turns can be read off on the thimble scale (Fig. 12) and fractions of turns on the rim of the thimble itself. This is called the "A" adjustment, and affects the log indications by the same percentage at all speeds. Referring to Figs. 12 and 14, a depending bracket 247 carried by a side arm 251 formed on lever 18 cooperates in guiding relationship with the sides of scissors elements 300 and 301 to prevent bodily rotation of the latter about a vertical axis.

The upper end of the auxiliary spring 21 is attached to the top of the auxiliary balance arm 19 (Fig. 13) by means of spring force hub 122 mounted in ball bearings 123. The auxiliary balance arm 19 is fork-shaped so as to straddle balance arm 18 and pivots on ball bearings 96 (Fig. 17) about balance shaft 95, the latter being journalled in the frame in bearings 107. An arm 31 carried by the upper end of the auxiliary balance arm is provided at its outer end with two ball bearings 126 that ride between two guides carried by sector 32, which by means of the "B" adjustment are made to rotate the auxiliary balance arm through an angle proportional to the speed of the ship, introducing an auxiliary moment, which affects the readings by a constant rate of increase or decrease of percentage as the speed increases. This "B" adjustment is effected by rotation of knob 33.

Rotation of knob 33, by hand, turns a worm 114 which rotates gear sector 32 and roller guide 156 about pivot 159, changing the angle the roller guide makes with the lead screw 36, a measure of which is indicated on "B" scale 34 by pointer 161 (Fig. 4). As seen in Figs. 4, 6, and 7, guide 156 has a high side and a low side for coacting engagement with the two rollers 126, without lost motion. Sector 32 is carried by a slide 116 which is guided for movement on a pair of bars or rods 158. The latter are so located that a radius from shaft 95 will bisect guides 156, when in neutral position. Therefore when the guide is in its neutral position, movement of the slide will not produce movement of auxiliary arm 19. If the roller guide is rotated clockwise from the zero position (guide parallel to lead screw), the auxiliary balance arm is rotated clockwise, introducing a moment opposing that of the main force arm, causing the log to indicate for a constant speed pressure a higher speed than that obtained with the roller guide parallel to the lead screw. Similarly, counterclockwise rotation of the roller guide from its zero position produces for a constant speed pressure a lower speed indication than that obtained with the roller guide parallel to the lead screw. This "B" adjustment, as noted, affects the log indications by a constant rate of increase or decrease in percentage as the speed increases.

It should be particularly observed that at zero speed the axis of rollers 126 coincides with the axis of segment 32. Accordingly, the latter may be adjusted at zero speed without increasing or decreasing the stress in either the main or auxiliary tension springs. Lead screw 36 engages a nut 154 on the slide and propels the latter along its guides.

Contact arm 20 holding slide contact 132 is fastened to the main balance arm through the contact pivot 134 and the contact arm support 136. Spring 137 keeps the proper pressure at the contact surfaces at all times. The action of the contacts and the power motor are described hereinafter.

Spur gear 141 (Fig. 10) on the shaft of power motor 45 meshes with gear 46, turning worm 144 carried by a shaft 30. As shown in Fig. 11, worm wheel 146 is on a shaft 44 which also carries a spur gear 147, the latter meshing with a gear 149, which, as shown in Fig. 4, is mounted upon and operates the worm shaft 47. Worm shaft 47 drives worm 15, which in turn drives worm wheel 42, the latter being keyed to shaft 220, as is also the cam 25, as shown best on Fig. 26. Bevel gear 35 on the drive shaft 47 drives another bevel gear which turns lead screw 36, meshing with follower nut 154 (Fig. 6). When the speed of the ship increases, this follower nut, together with gear sector and roller guide 156, is driven downwardly along slide shafts 158 (Fig. 7). Since the slide 116 and cam 25 are permanently interconnected by shaft 47 and the associated gearing, it is apparent that for any given angular position of cam 25 the slide 116 will assume a predetermined position along its guides.

Thus the movement of roller guide 156 is proportional to speed variation, and causes the "B" correction to be automatically effective upon the action of contact arm 20, so as to cut off current flow to motor 45 at the proper point in the movement of speed pointer 27.

At the upper end of the lead screw shaft 36 is a bevel gear drive 37 which turns center lead screw 38, journalled in frame 167 (Fig. 8). The latter slidably supports a guide rod 170 which in turn supports a pair of arms 124 and 125. As seen in Fig. 9, arm 124 has a nut portion 127 meshing with lead screw 38. Arm 125 is forked, so as to straddle arm 124 and roller 39 is journalled in the two legs thereof as seen in Fig. 5. The legs are also provided with adjustable stop screws 128 which cooperate with limit switches 181, 182, and 183. A spring 171 acts upon portions of arms 124 and 125 so as to constantly urge the roller toward the disc.

To sum up, the following devices are driven by the power motor 45: the main shaft 47 and cam 25 and pointer shaft 220, the screw spindle 36 of the runner of the "B" adjustment, and the screw spindle 38 of the distance transmitter which moves the friction wheel 39 across the face of the constant speed disc 40.

Follower roller 39 (Fig. 5) is pinned to the universal joint 42 which rotates on ball bearings mounted in the legs of forked arm 125. Spring 171 (Fig. 8) keeps the proper pressure between follower roller 39 and driving disc 40. Joint 42 provides sufficient endwise lost motion or play to permit roller 39 to move from the center to the periphery of disc 40. The disc is driven at constant speed by synchronous motor 41, through a worm 8 and a worm gear 9, which provide the desired speed of rotation of disc 40 as heretofore pointed out (Fig. 1). Motor 41 is connected to a 60 cycle source of constant frequency, as shown at 122 (Fig. 1a).

The three limit switches 181, 182, 183 (Fig. 4) are normally closed "micro" switches. Two of these (182 and 183) limit actuation of the follower 39 by shutting off the power motor 45 below —0.2 knot and above 40.0 knots; below +0.5 knots the limit switch 181 shuts off the synchronous motor 41 which drives disc 40.

Next will be described the novel compensating mechanism for correcting errors introduced into the log by tipping of the bellows assembly in response to roll or pitch of the ship. This tipping compensator consists of a rotatable and tiltable counterweight 71 (Fig. 21) supported by a pair of arms 72, on a counterweight shaft 73, for rocking movement about a horizontal axis. Shaft 73 is carried by a bracket 88 which has a collar 74 and is supported for free rotation about a vertical axis by a ball bearing 75 (Fig. 22) carried by a stationary support 76. Screw 77, which is threaded into the counterweight and bears against the collar 74 is so adjusted that when the axis is vertical a small clearance, as seen in Fig. 21 exists between a pair of fingers 86, formed as continuations of arms 72, and the flange of cup 87. When the ship tilts through an angle of 10° (in any direction of azimuth) the fingers 86 of the counterweight exert a downward force upon the flange of a bearing cup 87. The latter is carried by a bearing 78 whose inner race is secured to stem 14'. This introduces a compensating force on the bellows rod 14 through ball bearing 78. This force compensates for the change in vertical component of the weight of the bellows acting along the rod 14, produced by either roll or pitch (or a combination of both). Thus accuracy of measurements is assured at all times, regardless of the roughness of the waters through which the vessel is operating. It should be understood that the entire counterweight assembly is freely rotatable about bearing 75 and it accordingly may find its own position to that side of the apparatus toward which the axis of bearing 75 happens to be inclining in response to roll or pitch of the ship. Screw 77 is adjusted so that the counterweight bears against the side of collar 74 under normal non-rolling, non-pitching conditions, with the desired free-travel space between the ends of arms 86 and the flange of cup 87 so that under those conditions the bellows rod assembly may move upwardly without resistance from the counterweight. However, as soon as the rolling or pitch exceeds 10° from the vertical the counterweight swings away from the collar and exerts a downwardly directed compensating action. Below 10° no compensation is required to secure the desired accuracy of the instrument.

Figure 3:
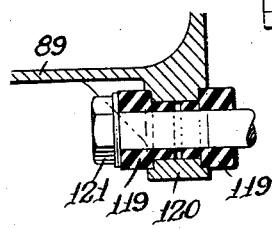
Fig. 3 shows one of the rubber shock mounts for unit B.

The unit "B," as heretofore noted, consists of two main parts: (1) the bellows assembly, mounted on the base of the case, and (2) the "log" mechanism, mounted in the case 89. The latter is protected by a tightly fitting cover 90 with a glass covered opening 91 for the speed scale. The entire "log" mechanism is mounted on a single brass frame 92 which is removable from the case itself, a pair of handles 93 being provided for ease of handling. Proper alignment is controlled by dowel pins. The case and frame are equipped with plug and jack units so that no electrical connections need be disturbed when removing the mechanism from the case. The complete instrument is rubber shock-mounted, and the housing is a water-tight, cast aluminum box. One of the shock mounts is shown in Fig. 3 and comprises a pair of rubber bushings 119 mounted in a counterbored opening in a lug 120. As shown, the bushings are of shouldered form so as to have a reduced diameter portion extending into the opening. This provides an efficient shock mount and when the case is secured to a bulkhead or the like by means of bolts 121 the unit is securely supported and yet metal-to-metal contact is avoided.

The pressure-static assembly contains three bellows: the main bellows 13, the upper (static) tightening bellows 5, and the lower (Pitot) tightening bellows 11. The static air valve 83 is arranged in the lid of the complete chamber in such a way that it may be used to let out any trapped air in the static chamber. The Pitot air valve 84 is arranged in the body of the chamber so that it may be used to let out any trapped air in the Pitot chamber. Drain plug 70 is removed for draining the Pitot chamber and screw 50 is removed from drain plug holder 43 to drain the static chamber.

The complete bellows assembly and its chamber 129 and its closure 130 hangs off the lower part of the "log" case, and is releasably held in place by means of four studs 131 and nuts 133 as shown in Fig. 21. The bellows chamber and closure support maneuvering cocks 381, 382 and air vent cocks 83, 84. The bellows chamber is secured to closure 130 by cap screws 135, as seen in Fig. 21. Flexible tubing (shown in Fig. 35) is used to permit lowering of the bellows assembly for test purposes by threading nuts 133 upwardly on studs 131, without disconnecting the tubing from the cocks. Bellows 5 is supported by a bellows cap 195 which is locked in closure 130 by means of a nut 196. Cap 195 is provided with a slotted upper end and a wrench 197 having a pair of fingers 198 (Fig. 23) is employed to hold the cap against rotation when nut 196 is being tightened or loosened. The post cap wrench 199 shown in Fig. 22a is used in assembling and disassembling the components of bellows rod 14.

The rodmeter includes a sea valve 138 (Figs. 29 and 35) which is of the gate valve type, having bolted on extensions 139 and 140 which support the Pitot-static streamline rod A, a cross section of the latter being shown in Fig. 33. A stuffing box 142 is arranged in the neck of member 140 in order to obtain a tight fit for the Pitot-static rod. The sea valve is operated by the valve stem 143 coupled through a bevel-gear drive 145 to a shaft 148 carrying hand wheel 150. The Pitot-static rod can pass through the valve when it is open. Member 139 is mounted directly to the ship's hull 2, as indicated in Fig. 35. The neck of member 139 may be arranged to protrude somewhat from the ship's bottom.

The Pitot-static rod, of a bronze streamline cross-section and containing two tubes, ends in a Pitot orifice 7' on the leading edge and three static openings, one on each side and one flush with the bottom of the rod. Hydraulic lines 6 and 7 are connected to the top of the Pitot-static rod by means of pipe fittings. At the top of the Pitot-static rod are two straps 152 and 153 and a handle 155, held in place by two pins 157 and bolt and nut assemblies. This feature permits removal of the handle in case damage renders the sea rod inextractable by pulling it inwardly. In such event two pins may be removed and the rod pushed through the valve and ejected into the sea by, and replaced with another rod.

The air collector 160 (Fig. 35) consists of a strong glass tube protected by a metal casing, and is provided with two shut-off valves 162 and 163, one at its upper end and the other at its lower end. Incoming water enters the air collector by the lower valve, and air collected leaves through the upper valve. Opening the upper valve releases the air collected in the tube. The lower valve is normally open.

All interior parts of the receiver unit "C" (Fig. 1a) are mounted on a brass plate equipped with disconnecting plugs so that the interior unit is completely demountable without removing any wires or electrical connections. The box is equipped with terminal boards and tapped holes for standard electrical conduit.

The speed receiving motor 67 drives pointer 68 and is coupled electrically to the speed generator 48 of the master transmitter-indicator (Fig. 1).

Any speed indicated by the pointer 21 of the master transmitter-indicator will also be indicated on dial 69, and also on all other speed indicators connected into the system, as, for example, the dial 269 of unit "D" (Fig. 1).

The distance receiver 164 (Fig. 1a) is coupled electrically to the distance transmitter 55 of Fig. 1. The shaft of receiver 164 is coupled through a gear train to counter 72, which is a six-place odometer, as shown.

The gear train is so arranged that counter 72 runs at 1/36 the speed of the distance transmitter 55 of the master transmitter-indicator.

Transformer 165 (Fig. 1a) converts the 115 volts, 60 cycles supply to a low voltage for the lighting circuit. Two lamps 75 furnish the illumination, which may be associated with the dial 19, in any suitable manner. Rheostat 166 controls the intensity.

The speed indicator "D" is completely housed in a watertight, cast aluminum box, equipped with a glass window through which the speed dial may be seen.

The constant frequency supply unit (Fig. 1a) consists of a D. C. motor-A. C. generator unit 122 maintained at constant speed by means of a tuning fork control, giving a constant frequency output of 60 cycles per second at 115 volts.

The single phase stator windings of the transmitter generators 48 and 55, and all indicator motors which are to be operated in circuit with these transmitters, are connected to the 115 volt A. C. supply. The three phase rotor windings of all these units are also interconnected. When the supply circuit is closed an alternating voltage is impressed upon the interconnected stator windings. The single phase current in the stator (primary circuit) of each unit, induces voltages in the three phases of the rotor (secondary circuit) of each unit. These induced voltages vary with the position of the rotor in relation to the stator.

When the rotor positions of the indicators are exactly the same as the rotor position of the transmitter, the voltages induced in the three phases of the rotors of the indicators are equal to the voltages induced in the corresponding three phases of the transmitter rotor. Since these voltages are equal, and therefore balance, no current will flow in these circuits.

If the rotor positions of the indicators are not the same as the rotor position of the transmitter, the voltages induced in the three phases of the rotors of the indicators will not be equal to nor balance the voltages induced in the corresponding three phases of the transmitter rotor. Due to this unequal condition, current will flow in these circuits, thereby creating a torque between the rotor and stator of each unit, which tends to change the rotor positions of the indicators to agree with the position of the transmitter rotor.

Since the transmitter rotor is mechanically operated and held in position, and the rotors of the indicators are free to turn, the rotors of the indicators will follow the transmitter rotor at the same speed and in the same direction whenever the transmitter rotor is moved, and will be in exact agreement with the transmitter rotor when it is held in position.

The self-synchronous motors are used to relay the speed and distance motions generated in the master unit by motors of the synchronous and induction types, which are called speed motors inasmuch as they rotate when power is applied, while self-synchronous motors lock into synchronism when power is applied.

The speed motors used in the master unit are (1) the two-speed, two-direction induction motor 45, which positions the speed mechanism, (2) the synchronous motor 41 which drives the integrating disc 40; and (3) the induction motor 62 which supplies auxiliary torque to the distance motion transmitted by generator 55.

The synchronous motor 41 drives the disc 40 of the integrating mechanism, as heretofore pointed out, and is connected to the source 122 of constant frequency, 60 cycles. The disc 40 revolves at 100 R. P. M., this speed being selected as it is most suitable for proper operation of the distance odometers 72 and 272 (the latter being in unit "E").

The motor 41 is a two-phase, four-pole, condenser start and run type, synchronous motor, and through a speed reduction unit within the motor frame gives 100 R. P. M. at its output shaft at all loads up to rated load.

Condenser 82 is shown as connected between two windings of motor 41, to produce phase displacement between said windings and thereby insure creation of the desired rotating magnetic field.

Motor 62 is a shaded-pole induction motor having a single-phase two-pole field winding as the main field, to which 115 volts, A. C., 60 cycles, is applied but which by itself, does not furnish starting or running torque. The shading coil 185, which controls the torque output, is connected to lines 186 and 187 which are brought out to two terminals, and connected to rheostat 60 as shown in Fig. 1. Increasing the resistance decreases the torque, and decreasing the resistance increases the torque, as heretofore pointed out. This motor has maximum torque at starting and will not run with the shading circuit open.

The power motor 45, as heretofore pointed out, drives the speed indicating mechanism of the master transmitter-indicator, and is set into motion by contact 20 whenever the main balance arm 18 is disturbed from its position of equilibrium by a change in speed pressure. This motor is a reversible, two-speed (in either direction), split phase, induction motor. The stator coils consist of a main single phase two-pole field winding 188 connected across the A. C. supply at 49, and four sets of split phase windings. Two sets 189 are so placed that their electrical axes are 67½° on either side of the main winding. The other two sets 190 are so placed that their electrical axes are 90° to that of the main windings.

The rotor is of the squirrel-cage, "short-circuited" type.

The contact arm 20 is connected through a phase shifting condenser 83 (Fig. 1) to one side of the A. C. supply. The contact assembly is carried by a block 191 which is pivoted at 173. The position of the contacts can be adjusted in relation to the contact arm by adjusting set screws 174 (Fig. 21). The contacts are connected to their respective stator windings on the power motor 45, which, in turn, are connected through the limit switches 182, 183 to the opposite side of the line.

The main winding of motor 45 is always on the line. The split phase windings are so connected that as the contact arm 20 moves in one direction or the other, it first makes contact to the 67½° winding and then the 90° winding which will cause rotation of the power motor in a direction such as to return the contact to its initial position. The opposite ends of the two windings on either side are connected together and then to one side of the limit switch 182 (or 183 as the case may be) which limits the rotation of the motor in that direction when follower roller 39 has come to the end of its free travel space. The other side of each limit switch is connected to the side of the line opposite to that side which is connected through condenser 83 to contact 20.

Since one split phase winding is placed at 67½° and the other at 90° and both are fed through the same phase shifting condenser 83, it follows that a two-stage acceleration and deceleration is obtainable in each direction, provided the rotor has a resistance high enough so that it will not run as a single-phase induction motor. As a result of this two-stage action, the operation of the motor 45 is smoother than would otherwise be the case, and any tendency to "over-shoot" or hunt, is correspondingly reduced.

This action is facilitated by providing resistors 81, which co-operate with condenser 83 to prevent or reduce arcing as contact arm 20 moves from one conducting segment to another. They also serve to apply a small "bucking" voltage to the motor windings, for speed retardation.

Resistor 59 acts as an auxiliary to limit switches 182, 183 to insure stopping of the motor by dropping the voltage of one quadrature winding to a value equal to that of the opposing quadrature winding, so that one rotational tendency is balanced by an equal rotational tendency in the opposite direction.

In Fig. 18 there is shown a test arm 175 and a weight 176, which are used in carrying out accuracy tests upon the apparatus before placing it in operation, and for also checking the accuracy of the instrument after it has been in service. For instance, after the "A" and "B" adjustments have been made to correspond to their factory settings, arm 175 is then hooked on to the main balance arm 18 as shown. The resulting speed indication is noted and weight 176 then hooked on to arm 175. The speed indication is then noted. These readings should agree with the speeds established at the factory for the particular instrument involved, and if they do not the system is not in order and should be investigated to determine the source of trouble.

Referring to Fig. 22, there is disclosed a third valve 177 and a drain line 178 associated with the inlet side of the bellows chamber.

Valve 177 may be turned to the position shown in Fig. 22 to test lines 6 and 7 for the presence of air. When a clear stream issues from line 178 without "spitting," these lines may be considered to be free of air. In the position of the valves shown, line 7 is undergoing test.

What is claimed is:

1. In an indicating instrument having a substantially vertically disposed actuating element; a support; means guiding said element for endwise movement on said support; an indicating device actuated by endwise movement of said element; and means responsive to inclination for automatically exerting downwardly directed forces upon said actuating element whenever the latter inclines a predetermined degree from the vertical in any vertical plane, to thereby modify the resulting actuation of said indicating device by said element.

2. The instrument defined in claim 1, together with means for causing said downwardly directed forces to be of predetermined magnitude when initially applied to said element and to increase in magnitude as said element inclines beyond said predetermined degree from the vertical.

3. The instrument defined in claim 1, wherein said automatic means comprises a mass mounted for rocking movement about a horizontal axis and stop means for preventing said mass from applying forces to said element until the latter attains said predetermined degree of inclination.

4. In an indicating instrument which is adapted to undergo tilting movements in a plurality of vertical planes during operation, a vertically disposed rod assembly adapted to undergo endwise actuation; an indicating device actuated by said rod assembly; and means for applying an endwise directed compensating force to said rod assembly when said instrument is tilted to a predetermined degree in any direction, comprising a support mounted for free rotation about the axis of said rod, and mass means, carried by said support, and operable to rotate the latter into the direction of tilt of said instrument and apply said compensating force to said rod assembly when said predetermined extent of tilt is attained.

5. The instrument defined in claim 4, wherein said mass means comprises a weight pivoted on said support for rocking movement about an axis disposed normal to said rod assembly and embodying a pair of arms operable to apply a downwardly directed force to said rod assembly when said weight is rocked.

6. The instrument defined in claim 4, wherein a thrust collar is rotatably supported on said rod assembly, and said mass means comprises a pair of arms straddling said rod assembly and operable to engage said collar when said instrument is tilted to said predetermined degree.

7. The instrument defined in claim 4, wherein said mass means comprises abutment means carried by said mass means and adapted to engage said support and hold said mass means in a predetermined neutral position when said instrument is tilted into positions of lesser degree than said predetermined degree.

8. In an indicating instrument, a substantially vertically disposed pressure responsive force-transmitting assembly; means normally guiding said assembly for movement in a generally vertical path; an indicating device operably connected to, and adapted to be actuated by movement of said force-transmitting assembly; and means responsive to inclination for automatically compensating for the decrease in the vertical component of the pull of gravity upon said force-transmitting assembly when the latter is inclined to the vertical, said last-named means being operable to apply compensating forces of increasing magnitude to said assembly as said assembly inclines further from the vertical, so as to modify the indication of said indicating device.

9. The indicating instrument defined in claim 8, wherein said last-named means is operable to apply compensating forces to said force-transmitting assembly automatically in response to inclination of the assembly in any direction from the vertical.

MORRIS F. KETAY.
MICHAEL SHERMAN.